United States Patent Office 3,097,945
Patented July 16, 1963

3,097,945
PROCESS OF AGGLOMERATING FINES OF MATERIALS CONTAINING IRON OF WHICH A PORTION HAS BEEN COMPLETELY REDUCED
Michel Henri Louis Marcel Paris, Pont-a-Mousson, and Eugène Marie Burstlein, Meudon, France, assignors to Compagnie de Pont-a-Mousson, Nancy, France, and SOVACO Societe pour la Vallorisation des Combustibles, Minerais et autres Matieres Minerales, Paris, France, both French bodies corporate
No Drawing. Filed Nov. 3, 1961, Ser. No. 149,840
Claims priority, application France Feb. 7, 1959
2 Claims. (Cl. 75—3)

The present application is a continuation-in-part of application Serial No. 6,865, filed on February 5, 1960, now abandoned, which relates to improvements in the agglomeration of fines of materials containing iron such as ore fines, blast furnace dusts, and the like in the form of compact blocks, referred to hereinafter in a general way as "agglomerates" or these agglomerates being more particularly intended for charging into blast furnaces.

It is known that the problem of agglomeration is of increasing importance in view of the fact that in order to achieve sufficiently satisfactory blast furnace operation and in particular a reasonable consumption of coke, it has been necessary to determine a particle size of the pieces of ore charged into the furnace, and this generally implies a prior breaking up of the blocks of ore coming from the mine which forms a large amount of finely divided elements which, if charged in an excessive amount into the blast furnace, would materially reduce, and possibly stop, the free circulation of the gases and consequently create serious disturbances in blast furnace operation.

An agglomeration of these finely divided elements into ovoids or briquettes is therefore necessary if it is desired to recover the iron contained therein. Depending on their origin, the ores contain the iron in the form of ferrous derivatives and/or ferric derivatives.

Further, it is known that there emanates from the throat of the blast furnace a large amount of fine dust entrained by the smoke and fumes coming from the bursting of the elements of the charge under the action of the heat when this charge reaches the melting zone. These dusts, which have not had time to undergo a complete reduction, mainly consist of iron oxide FeO and calcareous or siliceous gangue depending on the origin of the ore. Here again, it is possible to contemplate agglomerating these oxidized blast furnace dusts.

The agglomeration of ore fines, blast furnace dusts presents many difficulties owing to the requirements that the obtained agglomerates must satisfy. The latter must indeed have a high shock and crush resistance not only in the cold state so as to avoid deterioration in the course of the handling to which they are subjected, but also in the hot state when they have been charged into the blast furnace so as to preclude their being crushed under weight of successive charges and to leave, until melting occurs, passage for the fumes which rise from the lower part of the blast furnace to the throat. Moreover, they must be sufficiently porous to allow passage therethrough of the gases of the blast furnace in the course of the operation of transformation of the products containing iron. Further, to be economic, the agglomerating process must:

(a) Employ agglomerating products which are as cheap as possible, so as to reduce the cost price of the agglomerates.

(b) Permit obtaining agglomerates in which the proportion of gangue is as small as possible.

(c) Be equally applicable to the various products containing iron which might be used in charging a blast furnace.

Many processes have been proposed for agglomerating ore fines and other pulverulent substances containing iron. Some of these processes consist in employing as an agglomerating agent pitches, tars, or organic products known for their binding properties. However, the imperfect behaviour of these agents when subjected to heat and/or their partial distillation lead to the premature destruction of the briquettes or ovoids after they have been charged into the furnace before these ovoids have reached the reduction and melting zone, which results in many imperfections in blast furnace operation.

In other processes, acid and corrosive products are added to the products to be agglomerated in the presence of water. These latter products react with the iron oxide FeO which is contained in the product to be agglomerated and which, owing to the oxidizing action of the atmospheric oxygen are subsequently converted into ferric hydroxide $Fe(OH)_3$ whose known agglutinant properties are used for binding the grains or particles of the products to be agglomerated.

It should be mentioned that in these known processes the conversion into ferric hydroxide $Fe(OH)_3$ of the iron oxide occurs solely at the expense of the iron oxide contained in the materials to be agglomerated. The reaction is the more complete as the FeO content of these products is greater; this oxidation reaction does not occur, or occurs with great difficulty if the iron is in the form of ferric derivatives.

It follows that from the foregoing the agglomerating capacity of the products to be agglomerated essentially varies with the origin of the product in question and that consequently the mechanical properties of the agglomerates obtained may not possess the desired regularity from one bath to another.

An object of the invention is to provide a process of agglomerating finely divided products containing iron which permits obtaining agglomerates of regular quality irrespective of the origin of the product to be agglomerated.

A particular object of the invention is to provide a process of agglomerating finely divided products containing iron which comprises the following successive steps: complete reduction of an auxiliary charge comprising a product in the divided state substantially consisting of iron oxidized at least on the surface, the oxidized portion comprising, for example, a surface deposit of rust due to exposure of said product to atmosphere which always contains a certain proportion of steam, so that after this reduction all the oxidized portions of the auxiliary charge are entirely de-oxidized, crushing into fine particles of the fully reduced auxiliary charge; adding pulverulent sodium chloride to the crushed and reduced auxiliary charge; mixing and stirring the finely divided products to be agglomerated with the auxiliary charge added to the sodium chloride and with water so as to obtain a homogeneous mixture; moulding under pressure said mixture in the form of agglomerates; and drying said agglomerates in air.

In other words, the invention comprises creating ferric hydroxide $Fe(OH)_3$ no longer at the expense of the finely divided products to be agglomerated but from the reduced and crushed auxiliary charge added to said finely divided products which permits agglomerating finely divided products containing iron irrespective of the state of the latter.

Owing to the fact that a finely crushed auxiliary charge in which the iron is in the substantially inoxidized state is used for the agglomeration, the oxidation reaction of this iron is perfectly defined and total and therefore much more complete than that of the iron oxide FeO contained in the finely divided products to be agglomerated. The binding capacity is much greater than if natural iron oxide contained in the finely divided products to agglomerate were used for obtaining this binding. Further, the oxidation reaction is accelerated by the addition to the auxiliary charge of a small amount of sodium chloride.

The reduced auxiliary charge is easily obtained by reducing the initial charge in an atmosphere which is controlled in the presence of a reducing agent, such as carbon, or in a reducing atmosphere.

Preferably, before crushing, the reduced auxiliary charge is cooled in said reducing atmosphere.

The process according to the invention can be carried out in the following manner:

PREPARATION OF THE REDUCED AGGLOMERATING CHARGE

The initial charge in the divided form can be constituted by machining scrap (cuttings, turnings, and iron and steel filings), mill scales and converter projections. It is constituted almost exclusively of iron and iron oxide, these scrap products having been exposed to air to a varying extent. They are at any rate covered with a layer of rust or other oxide.

This initial charge is reduced in the known manner, for example by heating in a powder furnace of known type at a temperature between 900° and 1,150° C. in a reducing atmosphere which could be either a reducing gas such as carbon monoxide or a reducing atmosphere evolved by the charge in which there is previously incorporated a given amount of carbon, for example, powdered coke, in a proportion slightly in excess relative to that theoretically necessary for obtaining the reduction. The mixture is maintained in this furnace under these conditions for a period of time between about ½ hour and 4 hours, the shorter period corresponding to the highest temperature.

The mixture is thereafter cooled at least to 60° C. under the same reducing atmosphere. It is then subjected to a fine crushing which could be effected, if desired, under a neutral or reducing atmosphere and which is facilitated by the preceding operation, since the carbon of the coal incorporated in slight excess in the initial charge diffuses through the machining scrap of the initial charge and produces a carbonization which hardens and renders brittle the machining scrap materials.

The reduced and crushed charge is now ready to be used as an agglomerating product, the whole of the iron oxide contained in the powder having been reduced. It will be observed that as this completely deoxidized iron powder is easily oxidizable it should either be used immediately or stored away from oxygen.

THE AGGLOMERATING OPERATION

It is carried out under the following conditions:

Added to the reduced and crushed auxiliary charge is pulverulent sodium chloride in the proportion of 9 to 10% by weight of the reduced and crushed charge.

Thereafter, the principal charge constituted by the finely divided product to be agglomerated is admixed in a mixer with the auxiliary charge to which is added sodium chloride and with water. Depending on the nature of the principal charge to be agglomerated i.e. if this charge is humid the amount of water is reduced in proportion.

The mixture is then rapidly put into form of briquettes, for example in a brick or ovoid producing press of conventional type effecting a compression of about 150 to 200 kg./sq.cm.

In order to obtain a sufficiently rapid production it is well to effect the agglomeration in two stages. In the first stage, the mixture to be agglomerated is compressed under low pressure so as to bring the particles together and expell a part of the air contained in the mixture. Thereafter, this compressed mixture passes into the moulding press or the actual press which produces the briquettes or ovoids, in the course of which operation the remaining air contained in the mixture is expelled. In this way, agglomerates are obtained, for example briquettes or ovoids, the constituent parts of which are in close contact which encourages their agglutination in the course of the formation of ferric hydroxide.

After moulding, the agglomerates are stored away from rain and at the end of a rather short period of time, varying from a few minutes to half an hour, the oxidation of the iron of addition becomes noticeable. As this reaction is exothermic the temperature of the agglomerates rises and the heat given off causes evaporation of the water and thus achieves an automatic drying. It will be noted that the thickness of the heap must not be excessive, otherwise the steam given off by the agglomerates of the lower layers would condense on the agglomerates of the upper layers and moisten the latter and render them crumbly. It is therefore advantageous to arrange that the storage heap be well aired and have a thickness which is not exessive; preferably the thickness of the layer would be about 70 cm. When a briquette or ovoid forming press with a continuous output is used, the simplest method is to receive the agglomerates issuing from the press on a storage belt to which is imparted a slow movement of advance regulated in accordance with the optimum thickness of the layer to be obtained and whose length is such that at the output end of the belt the hardening of the agglomerates is complete.

At the end of a period of time of about a few hours, the hardening of the agglomerates is such that the latter can be used in the blast furnace. Thus, the agglomerates manufactured in this way can be charged rapidly into the blast furnace and the stock in the course of drying is therefore small.

The process according to the invention has many advantages.

As has already been mentioned, owing to the fact that the agglomerating product (auxiliary charge) is constituted by entirely deoxidized iron, the reaction is perfectly defined and is carried out with maximum efficiency.

As the reaction occurs with maximum efficiency, the amount of previously reduced auxiliary charge to use is materially less than the amount of charge that would be required if it contained iron which has not been de-oxidized. Thus, according to the invention, the amount of previously reduced, that is de-oxidized, iron powder used is from one third to one half the amount of iron turnings which have not been de-oxidized which would be required to obtain the same result.

As the agglomerating product is added separately and not obtained at the expense of the product to be agglomerated, it is possible to very accurately dose the amount of iron powder to add as a function of the properties and of the composition of the mixture to be agglomerated to obtain agglomerates having a suitable mechanical resistance.

The fact of employing as an agglomerating agent a material constituted by iron slightly increases the iron content of the agglomerates.

The absence in the mixture of substantial amounts of any body which is fusible, volatile or decomposable by heat, imparts to the agglomerates an excellent mechanical resistance even when in the hot condition, since they have no tendency to soften upon application of heat because the amount of sodium chloride is so small that its presence connot impair this resistance.

It has also been observed that in employing inoxidized iron as the agglomerating agent, the oxidation reaction, although rapid, only becomes noticeable at the end of some minutes. Thus, the ferric hydroxide acting as the binding agent between the particles to be agglomerated, is formed within the mixture after its compression into briquettes or ovoids and all the molecules of ferric hydroxide co-operate in insuring the binding of the particles to be agglomerated. In this way, at the moment of moulding under pressure there is avoided the rupture of the binding means which, with a quicker reaction, would have formed prematurely between the particles.

In view of the fact that in using inoxidized iron a complete oxidation reaction is insured, it becomes possible to control the amount of ferric hydroxide $Fe(OH)_3$ which is necessary and sufficient for insuring the hardening of the agglomerates without a local accumulation of ferric hydroxide occurring which, as is known, is accompanied by a swelling and might therefore cause the agglomerates to burst in the course of their hardening. This advantage is not to be found in the aforementioned processes of oxidation of iron oxide in which an excess amount of acid product has to be added in order to insure a more efficient reaction which could, in certain cases, lead to a bursting of the agglomerates owing to the excessive amount of ferric hydroxide formed.

As mentioned hereinbefore, the oxidation reaction generally starts only after moulding under pressure. It is therefore well to arrange that, in issuing from the press, the agglomerates have sufficient cohesion to avoid breaking up before hardening in the course of the handling which follows immediately after the moulding under pressure. In some cases, the ore fines to be agglomerated have a gangue containing argillaceous substances in an amount sufficient to insure the cohesion of the agglomerates; but, if the gangue contains an insufficient amount of, or even no, argillaceous substances it could be advantageous to add to the ore fines, when mixing, a small amount of plastic clay or bentonite to achieve this cohesion.

It should be mentioned that for a given fineness of reduced powder the amount of reduced powder to add is the greater as the products to be agglomerated are finer; similarly, the powder of reduced iron is the more reactive as its fineness is greater.

There will now be given some examples of applications of the process according to the invention.

*Example 1*

(a) *Principal charge.*—Let it be supposed that it is desired to agglomerate iron ore fines comprising a relatively large proportion of argillaceous substances (25% by weight) and having the following grain or particle size:

| | Percent |
|---|---|
| Elements retained on a 2 mm. mesh screen | 30 to 50 |
| Elements retained on a screen having meshes of 0.2 to 2 mm. | 30 to 60 |

(b) *Auxiliary charge.*—In the reducing furnace coke dust is incorporated in machining scrap to be reduced in the proportion of 10 to 25% by weight of machining scrap. By way of example, any one of the following charges A, B, C could be reduced:

| | Percent by weight |
|---|---|
| (A) Mill scale | 80 |
| Coke dust | 20 |
| (B) Very oxidized cast iron turnings | 92 |
| Coke dust | 8 |
| (C) Very oxidized iron turnings | 50 |
| Mill scale | 25 |
| Converter projections | 13 |
| Coke dust | 12 |

(c) *Composition of the mixture to be moulded to obtain the agglomerates.*—

Principal charge or iorn ore fines to be agglomerated containing 20% of argillaceous substance _____ 97.25 kg., namely 87% by weight (calculated in the dry state).

Reduced and crushed auxiliary charge (iron powder having a grain or particle size of 0.2 to 0.5 mm.) _____ 2.5 kg., namely 2.17%.

Sodium chloride _____ 0.25 kg., namely 0.33%.

Total amount of water comprising the water naturally contained in the damp ore, 8 to 11 kg., and water added in the course of mixing as a function of the dampness of the ore, 4 to 1 kg_____ 12 kg., namely 10.5%.

Total weight of the damp mixture to be moulded _____ 112 kg.

(d) The hardening time of the agglomerates is about 3 hours.

*Example 2*

Let it be supposed that it is desired to agglomerate an iron ore having the same particle size as that of the preceding example and comprising a smaller proportion of argillaceous substances of only about 10%; as mentioned hereinbefore, it is advantageous, in order to obtain a better cohesion immediately after moulding to add to the ore fines a small amount of natural binder, such as bentonite. The principal charge can have the following composition:

Ore fines (weight calculated in the dry state) _____ 95.75 kg., namely, 85.6%.

Bentonite _____ 1.5 kg., namely 1.4%.

The remaining constitutents are as indicated in the preceding example.

*Example 3*

Let it be supposed that it is desired to agglomerate blast furnace dusts having a particle size which is much finer than those of the foregoing ores, since more than 90% of these dusts pass through an 0.5 mm. mesh screen.

The composition of the mixture to be agglomerated can be the following:

Principal charge:
  Blast furnace dusts _____ 75.5 kg., namely 65.4%.
  Bentonite_____ 8 kg., namely 7%.

Reduced and crushed auxiliary charge (iron powder having a particle size of 0.2 to 0.5 mm.)_____ 15 kg., namely 13%.

Sodium chloride _____ 1.5 kg., namely 1.3%.

Amount of total water (comprising 0 to 3 kg. of water contained in the blast furnace dusts and 12.5 to 15.5 kg. of water added in the course of mixing _____ 15.5 kg., namely 13.3%.

Total weight of the mixture_____ 115.5 kg.

As can be seen from this example, the proportion of auxiliary charge is materially greater than in the preceding examples, since the blast furnace dusts to be agglomerated are finer than the ores.

*Example 4*

Let it be supposed that it is desired to agglomerate the same blast furnace dusts as those in Example 3 but in using an auxiliary charge of a more finely crushed iron powder, that is a powder having, for example, a particle size of less than 0.2 mm. instead of the particle size of 0.2 to 0.5 mm. used in the preceding examples; in this case, it is possible to reduce the proportion of auxiliary charge by almost one half. Thus, the proportions of the mixture to be moulded can be the following:

Principal charge:

| | |
|---|---|
| Blast furnace dusts | 83.2 kg., namely 72%. |
| Bentonite | 8 kg., namely 7%. |
| Reduced and crushed auxiliary charge (iron powder having a particle size of less than 0.2 mm.) | 8 kg., namely 7%. |
| Sodium chloride | 0.8 kg., namely 0.7%. |
| Total amount of water | 15.7 kg., namely 13.3%. |
| Total weight of the damp mixture | 115.5 kg. |

As can be seen from the Examples 3 and 4, the proportion of the auxiliary charge (reduced and crushed iron powder) required for the agglomeration of blast furnace powders is relatively high. The cost of the operation is therefore high too. Experience has shown that if ore fines and blast furnace dusts are mixed, the amount of reduced and crushed iron powder to add to this mixture to agglomerate it is materially less than in the Examples 3 and 4. In practice, the proportion of auxiliary charge does not much exceed the proportion required for agglomerating the ore alone so long as the proportion of the blast furnace dust is less than 30% and preferably about 10%.

Thus, there is advantage to be gained in not agglomerating blast furnace dusts alone but in mixing them with ore fines.

The following is an example in which blast furnace dusts are mixed with ore fines.

*Example 5*

Principal charge to be agglomerated:

| | |
|---|---|
| Iron ore fines containing 20% by weight of argillaceous substances and of which 30 to 50% passes through a 2 mm. mesh screen whereas 30 to 60% is retained on a screen having meshes of 0.2 to 2 mm. | 85 kg., namely 75.7%. |
| Blast furnace dusts identical to those of the Examples 3 and 4 | 10 kg., namely 8.9%. |
| Bentonite | 2 kg., namely 1.8%. |
| Reduced and crushed auxiliary charge (iron powder having a particle size of 0.2 to 0.5 mm.) | 2.75 kg., namely 2.45%. |
| Sodium chloride | 0.25 kg., namely 0.22%. |
| Total amount of water (comprising 7 to 10 kg. of water contained in the damp ore, 0 to 0.5 kg. contained in the blast furnace dusts, and 5.5 to 1.5 kg. of water added in the course of mixing) | 12.5 kg., namely 11.1%. |
| Total weight of the damp mixture to be moulded | 112.5 kg. |

Although specific examples of the invention have been described, it must be understood that the scope of the invention is not limited thereto but defined in the appended claims.

Having now described our invention what we claim as new and desire to secure by letter patent is:

1. Process of agglomerating finely divided products containing iron, said process comprising the following successive steps: completely reducing an auxiliary charge comprising a product in the divided state substantially constituted by iron oxidized at least superficially so that after said reduction all the oxidized portions of the auxilary charge are entirely de-oxidized; crushing the completely reduced auxiliary charge into fine particles; adding pulverulent sodium chloride to the crushed and reduced auxiliary charge, mixing and stirring the finely divided products to be agglomerated with the auxiliary charge added to the sodium chloride and with water, so as to obtain a homogeneous mixture, moulding under pressure said mixture in the form of agglomerates, and drying said agglomerates in air.

2. Process of agglomerating as claimed in claim 1, wherein the auxiliary charge is reduced in a reducing atmosphere after which the reduced auxiliary charge is cooled in said reducing atmosphere before said crushing.

References Cited in the file of this patent

UNITED STATES PATENTS

| | | |
|---|---|---|
| 1,315,315 | Lammerhirt | Sept. 9, 1919 |
| 1,526,400 | Waldmann | Feb. 17, 1925 |
| 1,536,032 | Stillman | Apr. 28, 1925 |
| 2,059,229 | Gregg | Nov. 3, 1936 |
| 2,363,371 | Vignos | Nov. 21, 1944 |
| 2,660,569 | Reitlingler | Nov. 24, 1953 |
| 2,746,920 | Wunderley | May 22, 1956 |
| 2,779,671 | Fosotte | Jan. 29, 1957 |